(No Model.)
F. VOLLERY.
WEED EXTRACTOR.
No. 316,084. Patented Apr. 21, 1885.
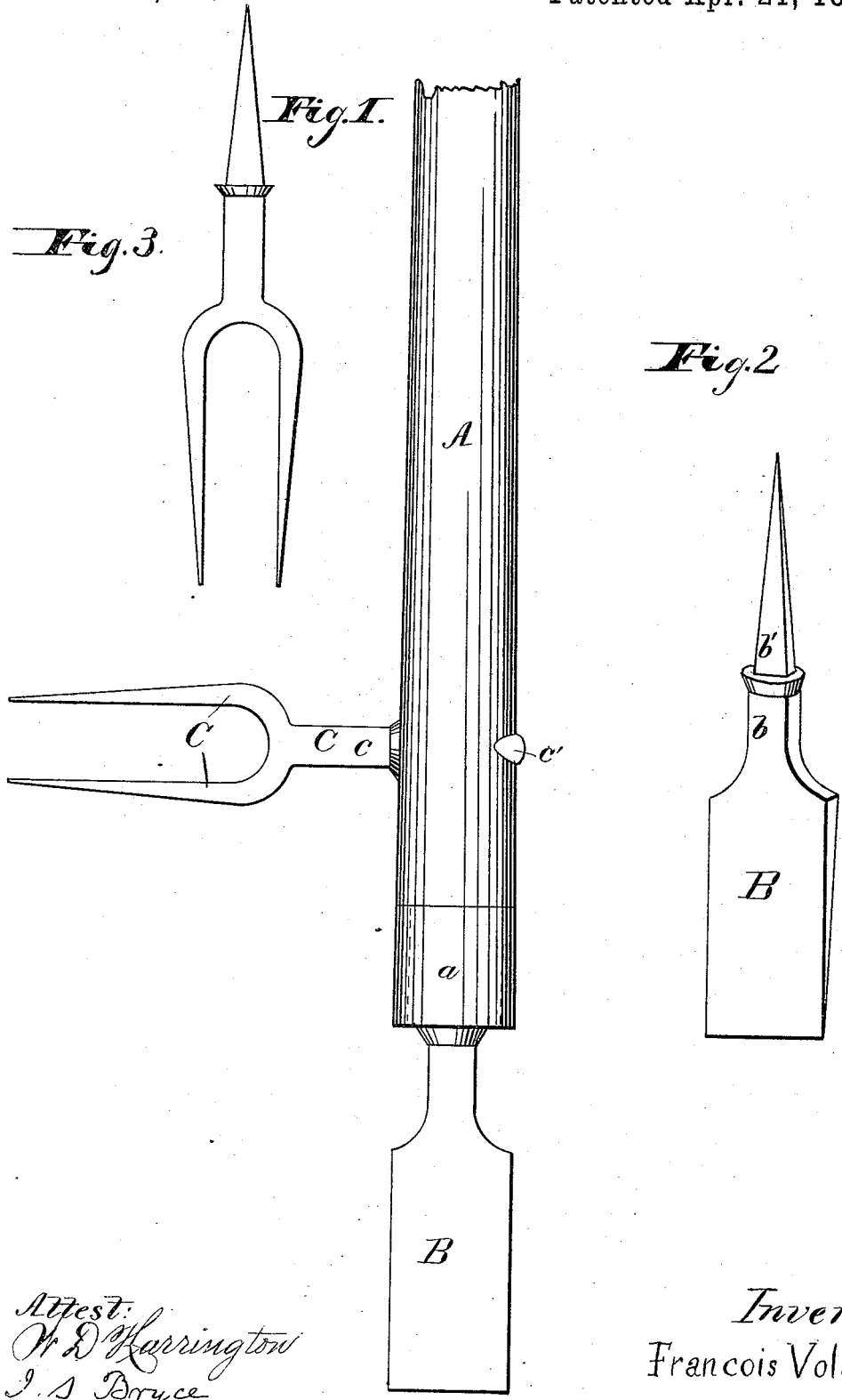
Attest:
W. D. Harrington
J. A. Bryce
Inventor
Francois Vollery

UNITED STATES PATENT OFFICE.

FRANÇOIS VOLLERY, OF WASHINGTON, DISTRICT OF COLUMBIA.

WEED-EXTRACTOR.

SPECIFICATION forming part of Letters Patent No. 316,084, dated April 21, 1885.

Application filed February 27, 1885. (No model.)

*To all whom it may concern:*

Be it known that I, FRANÇOIS VOLLERY, a citizen of the Republic of Switzerland, residing temporarily in the city of Washington, in the District of Columbia, have invented certain new and useful Improvements in the Class of Garden Implements which are known as "Weed-Extractors," of which the following is a description.

In the accompanying drawings, Figure 1 is a plan view of the implement as seen when lying upon the ground or other flat surface. Fig. 2 is a plan view of the chisel-shaped cutter detached from its stock or handle. Fig. 3 is a plan view of the lifting or extracting fork detached from the handle.

In all the figures, A is the handle, B the cutter, and C the lifting or extracting fork, while in Fig. 1 $a$ is a securing-ferrule to prevent fracture of the handle. In Fig. 2, $b$ is the shank and $b'$ the tang of the cutter, and in Fig. 3 $c$ is the shank and $c'$ the tang of the extracting-fork. The handle A is preferably about three and one-half feet in length, and of a diameter of about one inch at its larger end. The cutter is preferably about one inch in width, and of a thickness of from three-sixteenths to one-fourth of one inch at the base of the shank, diminishing in thickness from that point to its lower extremity, where it terminates in a cutting-edge. The blade of the cutter, including the shank, will ordinarily be about three inches in length, and the tang about two inches. An orifice of corresponding dimensions is provided in the larger end of the handle, and within this the tang is snugly fitted, while the metallic ferrule serves to prevent fracture of the handle, either by the insertion of the tang or by subsequent use of the implement. Above the inner extremity of this longitudinal orifice in the end of the handle is a transverse perforation for the reception of the tang $c'$ of the extracting-fork. This tang is of a length of about one and one-half inch, so that its pointed end, which will project through the handle about one-half inch, may be bent back against the handle to hold the fork firmly in place.

In the use of the implement the cutter is first thrust obliquely into the earth to sever the stem of the plant or weed, and the cutter being then withdrawn the prongs of the fork are so placed as to embrace the body of the weed, the cutter resting by its lower end upon the ground, when a turn of the handle will lift the weed from the earth, the entire operation consuming but a few seconds of time and wholly obviating the necessity of stooping or kneeling in removing the weed.

Having described my invention, I claim—

1. A garden implement consisting of a handle, a cutter fitted to the end of the handle and forming a prolongation thereof lengthwise, and a fork fitted to the handle and projecting outwardly from the handle at right angles to the same.

2. The combination of the handle A, provided with a longitudinal orifice in the end of the same, and provided also with a transverse perforation, the cutter B, provided with a tang, $b'$, which extends into the longitudinal orifice, and the fork C, provided with a tang, $c'$, which is fitted into the transverse perforation.

FRANÇOIS VOLLERY.

Witnesses:
W. D. HARRINGTON,
I. S. BRYCE.